United States Patent
Keller et al.

(10) Patent No.: US 6,759,764 B1
(45) Date of Patent: Jul. 6, 2004

(54) GRID LOAD LOGIC

(75) Inventors: Timothy J. Keller, Albuquerque, NM (US); Mohamad H. Vhora, Tempe, AZ (US); Cuong Van Nguyen, Redondo Beach, CA (US)

(73) Assignee: Hybrid Power Generation Systems LLC, Torrance, CA (US)

( * ) Notice: Subject to any disclaimer, the term of this patent is extended or adjusted under 35 U.S.C. 154(b) by 498 days.

(21) Appl. No.: 09/898,937

(22) Filed: Jul. 3, 2001

Related U.S. Application Data

(60) Provisional application No. 60/215,782, filed on Jul. 5, 2000.

(51) Int. Cl.[7] ................................... H02J 3/38
(52) U.S. Cl. .......................... 307/44; 307/52
(58) Field of Search ................ 307/44, 52, 64; 700/287

(56) References Cited

U.S. PATENT DOCUMENTS

| | | |
|---|---|---|
| 3,518,445 A | 6/1970 | Wichman |
| 3,678,284 A | 7/1972 | Peters |
| 3,944,837 A | 3/1976 | Meyers et al. |
| 4,262,209 A | 4/1981 | Berner |
| 4,731,547 A | 3/1988 | Alenduff et al. |
| 5,536,976 A | 7/1996 | Churchhill |
| 5,855,112 A | 1/1999 | Bannai et al. |
| 5,903,116 A | 5/1999 | Geis et al. |
| 5,994,872 A | 11/1999 | Hall |
| 6,020,713 A | 2/2000 | Geis et al. |
| 6,023,135 A | 2/2000 | Gilbreth et al. |
| 6,031,294 A | 2/2000 | Geis et al. |
| 6,055,163 A | 4/2000 | Wagner et al. |
| 6,072,302 A | 6/2000 | Underwood et al. |
| 6,118,238 A | 9/2000 | Munro et al. |
| 6,128,204 A | 10/2000 | Munro et al. |

FOREIGN PATENT DOCUMENTS

| | | |
|---|---|---|
| EP | 0 901 218 A2 | 3/1999 |
| WO | WO97/09524 A1 | 3/1997 |
| WO | WO98/25014 A2 | 6/1998 |

*Primary Examiner*—Gregory J. Toatley, Jr.
(74) *Attorney, Agent, or Firm*—Sutherland Asbill & Brennan LLP

(57) ABSTRACT

A method of supplying supplemental power from a supplemental power source in addition to that from a primary power source in order to meet power demand of a load, comprising: measuring power flow from the primary power source to the power load; developing an error signal by subtracting a fixed power offset from the actual primary power source power measurement; establishing a gain; creating an input by multiplying the error signal by the gain; creating a supplemental power source power adjustment command based upon the input; and adjusting the power output of the supplemental power source based on the supplemental power source power adjustment command.

30 Claims, 5 Drawing Sheets

GRID LOAD FOLLOW (REV. 1.1)

GRID LOAD FOLLOW (REV. 1.1)

GRID LOAD LOGIC

CROSS-REFERENCE TO RELATED APPLICATIONS

This application claims the benefit of the filing of U.S. Provisional Patent Application Serial No. 60/215,782, entitled "Grid Load Logic", filed on Jul. 5, 2000, and the specification thereof is incorporated herein by reference.

SUMMARY OF THE INVENTION

The present invention is of a method of supplying supplemental power from a supplemental power source in addition to that from a primary power source in order to meet power demand of a load, comprising: setting a set point for power received from the primary power source; establishing a variable gain for the supplemental power source; and employing the variable gain, periodically adjusting power supplied by the supplemental power source based on deviations between power actually received from the primary power source and the set point. In the preferred embodiment, establishing comprises establishing a variable gain that is higher for negative deviations between power actually received from the power source and the set point than for positive deviations. Employing comprises adjusting via a variable gain reset—hold integrator and measuring power actually received from the primary power source via a digital meter. The digital meter communicates readings to a supervisory control and data acquisition system, and control personnel are permitted to change the set point and variable gain by command to the supervisory control and data acquisition system via a World Wide Web browser interface. The supplemental power source is preferably a turbine generator. The method results in load transients being absorbed by the primary power source rather than the supplemental power source. The size of the power adjustment in each period is based on the product of the variable gain and a size of the deviation between power actually received from the primary power source and the set point Adjustment is made only when deviations between power actually received from the primary power source and the set point are outside a tolerance band. The tolerance band is established at least in part based on operating limitations of the microturbine and/or on a desired insensitivity to small changes in the load. The set point is automatically reset to zero based on a turbine status bit related to an operating condition of the turbine, wherein the operating condition is chosen from the group that includes turbine speed, turbine inlet temperature, turbine exhaust temperature, fuel flow, and power output.

The invention is also of a method of maintaining a fixed flow offset between the primary flow source and the supplemental flow source in a system employing a primary flow source and a supplemental flow source to satisfy a demand, wherein the supplemental flow source supplies flow to meet at least a portion of the demand, comprising: creating an actual primary flow source measurement by measuring flow from the primary flow source to the demand; developing an error signal by establishing a difference between the fixed flow offset from the actual primary flow source flow measurement; establishing a gain; creating an input by multiplying the error signal by the gain; establishing a predetermined tolerance range; creating a supplemental flow source flow adjustment command based upon the input; and adjusting the flow output of the supplemental flow source based on the supplemental flow source flow adjustment command, thereby driving the error signal to within the predetermined tolerance range. In the preferred embodiment, the gain is a variable gain and creating a supplemental flow source flow adjustment command comprises integrating the input.

The invention is further of a method of maintaining a fixed power offset between the primary power source and the: supplemental power source in a system employing a primary power source and a supplemental power source to satisfy a power load, wherein the supplemental power source supplies power to meet at least a portion of the power load, comprising: creating an actual primary power source measurement by measuring power flow from the primary power source to the power load; developing an error signal by subtracting the fixed power offset from the actual primary power source power measurement; establishing a gain; creating an input by multiplying the error signal by the gain; establishing a predetermined tolerance range; creating a supplemental power source power adjustment command based upon the input; and adjusting the power output of the supplemental power source based on the supplemental power source power adjustment command, thereby driving the error signal to within the predetermined tolerance range. In the preferred embodiment, the gain is a variable gain and creating a supplemental flow source flow adjustment command comprises integrating the input.

The present invention is additionally of a method of maintaining a fixed power offset between the grid and the end-user's power load regardless of the load demanded up to the microturbine's predetermined maximum power output in a grid-connected application of a microturbine having an adjustable power output up to a predetermined maximum power output and wherein the microturbine supplies power to meet at least a portion of an end-user's power load, comprising: creating an actual grid power measurement by measuring power flow from the grid to the end-user's power load; developing an error signal by subtracting the fixed power offset from the actual grid power measurement; establishing a gain; creating an input by multiplying the error signal by the gain; establishing a predetermined tolerance range; creating a microturbine power adjustment command based upon the input; and adjusting the power output of the microturbine based on the microturbine power adjustment command, thereby driving the error signal to within the predetermined tolerance range. In the preferred embodiment, the gain is variable and preferably is higher for an error signal representing a negative deviation between the actual grid power measurement and the fixed power offset than for positive deviations. Creating a supplemental flow source flow adjustment command preferably comprises integrating the input. The tolerance range is established at least in part based on operating limitations of the microturbine and/or on a desired insensitivity to small changes in the end-user's power load. Creating an actual grid power measurement preferably comprises employing a digital meter which communicates readings to a supervisory control and data acquisition system. Control personnel are permitted to change the fixed power offset and gain by command to the supervisory control and data acquisition system via a World Wide Web browser interface. The method results in load transients being absorbed by the grid rather than the microturbine. The fixed power offset is automatically reset to zero based on a turbine status bit related to an operating condition of the turbine, wherein the operating condition is chosen from the group that includes turbine speed, turbine inlet temperature, turbine exhaust temperature, fuel flow, and power output.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating specific embodiments of the invention and are not to be construed as limiting the invention. In the drawings.

DESCRIPTION OF THE INVENTION

Figure 1:
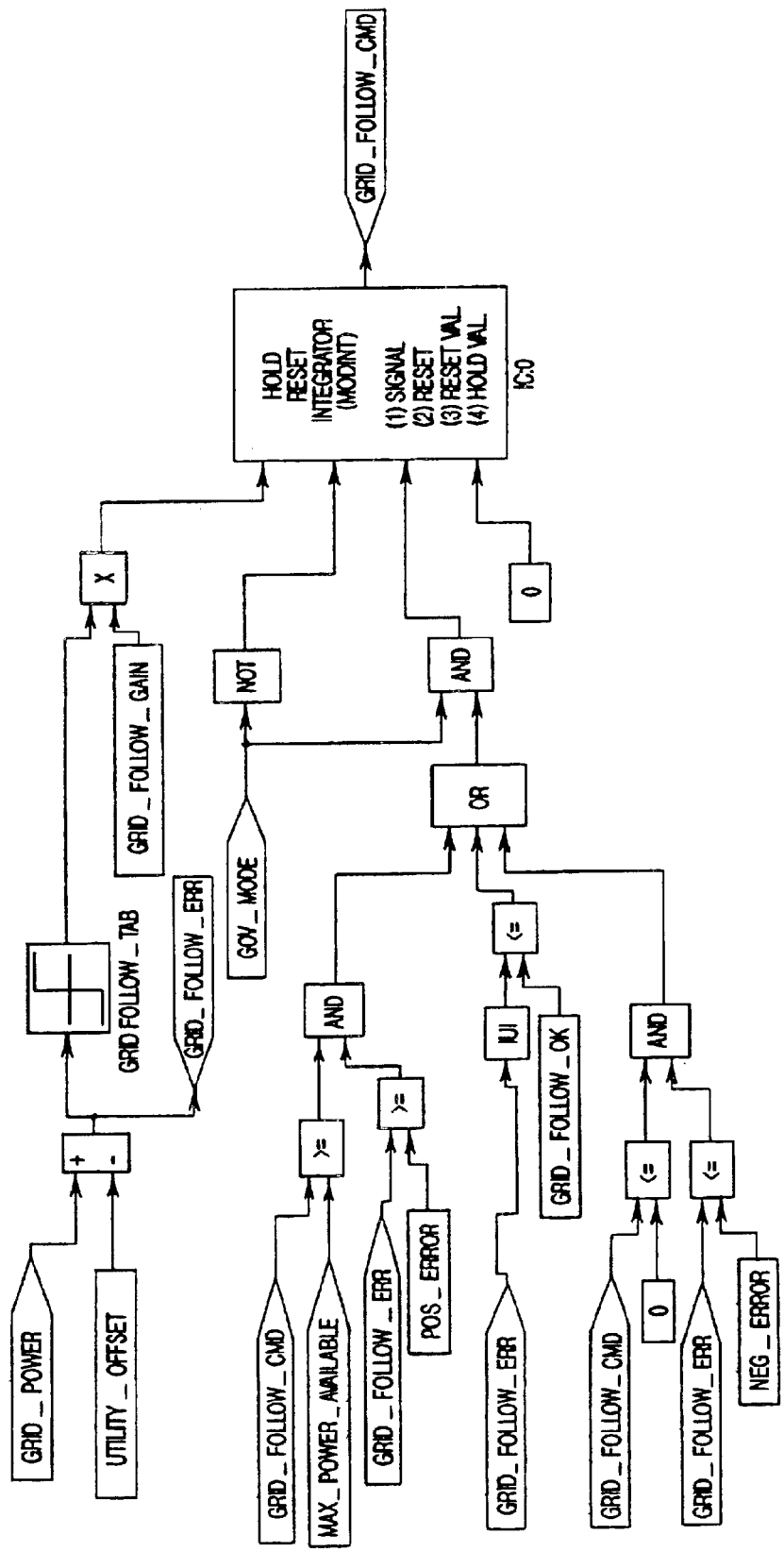
FIG. 1 is a grid logic diagram according to an embodiment of the present invention.

The present invention comprises control logic used in connection with a system of satisfying a demand by employing a primary flow source and a supplemental flow source, such as, for example, a system employing a primary power source and a supplemental power source. In one embodiment, the control logic effectively controls a supplemental power source comprising a microturbine power generating system used in grid-connected mode to meet power requirements of an end-user's load.

An embodiment of the present invention comprises a variable gain, which optionally comprises a reset. When the invention is applied to a turbine generator, the inventive control is useful for controlling the turbine generator in response to a change in load. For example, the generator's load may be increased and/or decreased. When the load is increased, error is optionally defined as a positive error between current output and desired output. In such an instance, the gain is optionally adjusted in accordance with the error. In this instance, the inventive control maintains proper operation of the turbine generator. When a load is decreased, the error is, for example, defined as a negative error. The inventive control, as applied, optionally controls the turbine generator in a manner different than if the error were positive. For example, the turbine generator's constraints may differ depending on whether a load is added or dropped. In many instances, dropping a load results in flow of power from the generator to the grid (or other additional source). In such instances, a high gain is useful to minimize the amount of power flow from the generator to the grid. In many instances, such an adjustment can be achieved in a more aggressive manner than in the case of an increased load. Therefore, the present invention encompasses control logic that comprises different action based on whether a load is dropped or added. In one embodiment, this is referred to as asymmetrical control. When a commercial grid places strict limitations on power flow into a grid, such asymmetrical control is highly advantageous. In one embodiment, the gain for a decrease in load on the generator is approximately an order of magnitude higher than a gain for an increase in load, given the same magnitude of error. Of course, control can optionally vary depending on past history of a generator's power flow into the grid.

Often users of a particular "on-site" power source want to place a meter between their load (or power demand) and a grid (e.g., the electric utility grid) and regulate the power from the grid to a fixed offset, e.g., 8 kW. In a specific embodiment, a Supervisory Control and Data Acquisition (SCADA) system is used to read the power flow from the meter and to communicate this information to an ECU, engine control unit—senses and actuates for running and monitoring engine/turbine—microprocessor based system. The particular "on-site" power source provides the load with the remaining power. A controller (ECU) determines if the power from the grid is above or below the offset. If the power deviates, then the controller raises or lowers the power level (using, for example, integral control) to adjust the particular "on-site" power output source until the power out of the grid exactly matches the offset, i.e., as more power is input from the particular power source, the input from the grid drops.

In one embodiment, power from the grid is read into the control using a power meter. In this embodiment, the power meter is readable by a SCADA system via an Ethernet connection, or serial connection (either locally or using a modem). In this embodiment, TCP/IP (Transmission Control Protocol/Internet Protocol) can be utilized allowing interfacing to the meter. Next, an offset value is subtracted from the meter reading, resulting in the power error signal. The offset value can be remotely set, via the previously mentioned connection methods. Then an ECU uses a Reset/Hold integrator to adjust the power output of the particular power source until the error signal is within a predetermined tolerance band. With each load change greater than the tolerance band, the control acts to drive the error signal to zero.

The meter that measures load to (or from) the grid is a digital meter which can be connected remotely to a prime mover via a computer network and controlled via a Web Browser. The meter can also be connected directly to a power generator, such as a microturbine (or turbogenerator) power system, without a computer network.

Commercially available power meters include General Electric and Landis & Gyr Power Meters. These commercially available power meters optionally include a RS232 interface to provide connection to the unit either directly or via a modem thus allowing the unit to be remotely controlled from virtually anywhere. The present invention optionally comprises such interfaces for remote monitoring and/or control interaction. The present invention optionally comprises an interactive meter in combination with inventive control logic. Remote access to the control logic and/or, for example, locally measured data, allows for supervisory and/or interactive control. Such an inventive system offers users an important advantage in that debugging and/or tuning can be accomplished remotely by, for example, an equipment supplier.

According to an embodiment of the present invention, control parameters are optionally adjustable via a remotely located computer. Such control parameters include, but are not limited to, the power offset and dead-band adjustment. According to another embodiment, operation in parallel with a power grid allows load transients to be absorbed by the grid and thus allows the power generator to adjust its power output slowly to operate in a more efficient manner. In yet another embodiment, a control algorithm uses a variable gain reset—hold integrator allowing variable power output rates, i.e. the increasing rate and decreasing rate are different to minimize reverse power flow and to allow optimal power generator efficiency.

The present invention provides many advantages associated with computer network interfacing and control. For example, remote control allows an operator to perform simulations on a remote computer system immediately after receiving and/or sending data to the control system. Simulations may prove useful in reprogramming and/or otherwise controlling the system. For example, a computer simulation may be used to predict behavior for a given control action before actually implementing such a control action. In one embodiment, the present invention comprises a World Wide Web appliance, in that at least some control and/or monitoring of the system and/or the controller is effectuated via the Web.

The present invention has many uses. For examples, the invention is useful whenever at least two power sources are used. Thus, automobiles and other transport devices that use two power sources may optionally be controlled by the invention. For example, the present invention optionally has the ability to control gas and electrical power sources. While in most instances, a load does not act as a source, the present invention is also useful where a load comprises a source. The present invention also encompasses control of multiple generators and/or multiple grids. In addition, a single grid may optionally comprise multiple generators. According to the present invention, a grid comprises a source of power, such as, but not limited to, a commercial grid, a generator, a solar device, a water driven device, a wind driven device, a motor driven device, etc.

EXAMPLES

Referring to FIG. 1, a grid logic diagram is shown according to one embodiment of the present invention. The logic is shown in a SIMULINK® (The MathWorks, Inc., Natick, Mass.) format. SIMULINK® software provides an interactive tool for modeling, simulating, and analyzing dynamic systems. Commonly used in control system design, DSP (digital signal processor) design, communication system design, and other simulation applications, SIMULINK® software enables building of graphical block diagrams, simulation of dynamic systems, evaluation of system performance, and refinement of designs. Through its seamless integration to SIMULINK®, STATEFLOW® software provides event-handling simulation and supervisory logic.

This particular embodiment comprises a variable proportional gain wherein the gain is optionally a function of error. The power output command, GRID_FOLLOW_CMD, is held at zero by asserting the reset function until the power system reaches a power generation speed as indicated by the parameter GOV_MODE. The power read from the meter is called GRID_POWER, and the power offset (desired amount of power to be flowing from the grid) is called UTILITY_OFFSET. GRID_POWER is subtracted from UTILITY_OFFSET to create an error signal called GRID_FOLLOW_ERR. The error signal is multiplied by a gain (combination of GRID_FOLLOW_TAB, and GRID_FOLLOW_GAIN), which varies as a function of error. The error multiplied by the gain is fed into an integrator, which adjusts the power output to drive the error signal to within the tolerance band. The tolerance band is determined by three conditions: Positive power command above the limit of the turbine AND error above $POS_{13}$ ERROR, OR the error within the +/−GRID_FOLLOW_OK, OR the power command is zero AND the error is below NEG_ERROR. In practice, the tolerance band may be established based on the desired insensitivity of the system/method to small changes in the load, such as when the end user turns a single light switch on or off.

Figure 2:
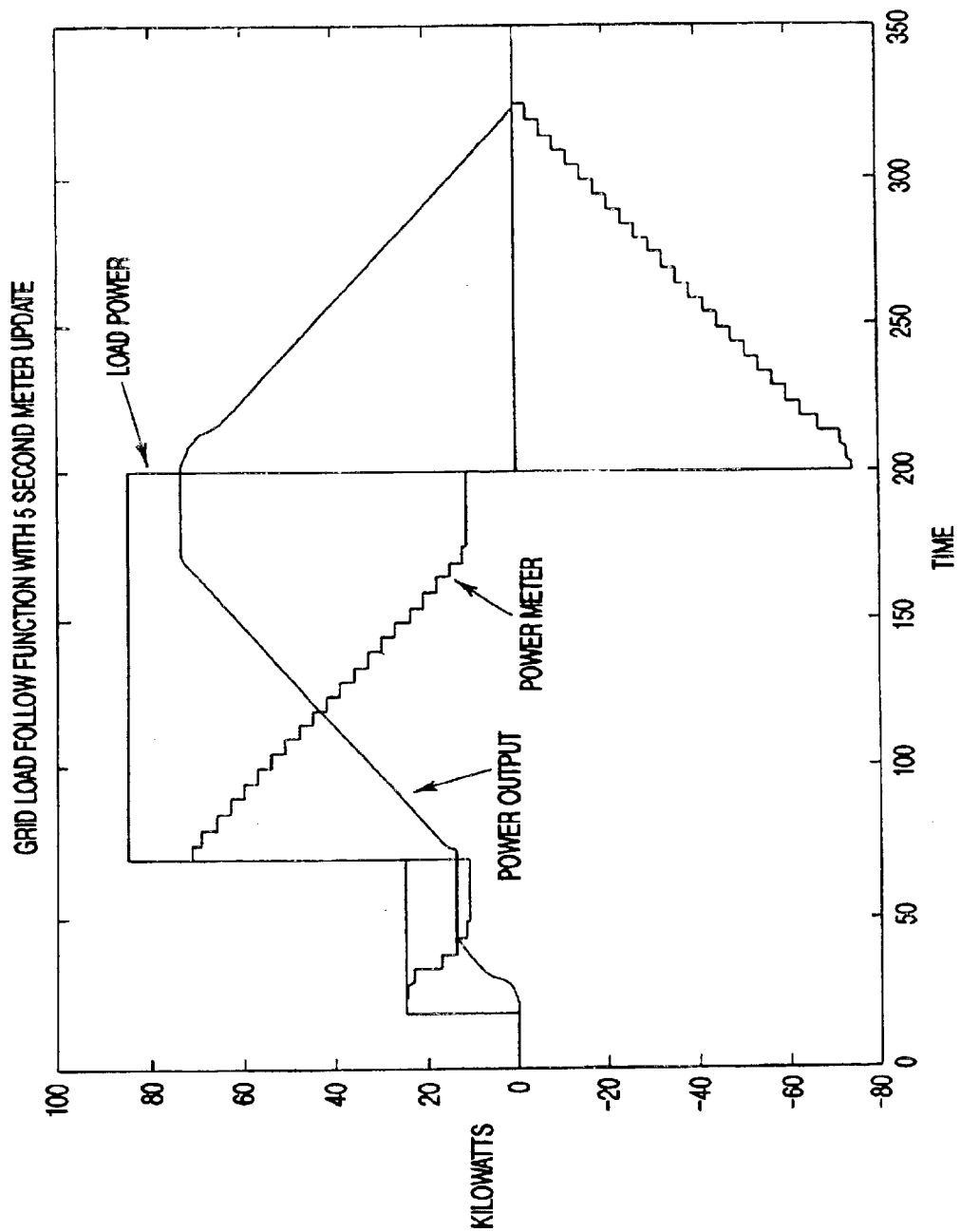
FIG. 2 is a plot of power versus time under grid logic control of an embodiment of the present invention wherein a 5 second update rate is used.

Referring to FIG. 2, a plot of power in kilowatts versus time in seconds is shown. In this particular example, the control logic was provided with a power meter reading every five seconds. This plot shows three values changing over time: power output from a power generator (Power Output$_{TG}$), load power or power demand (Load Power), and power from a grid, e.g., measured by a power meter (Power Meter). Throughout the plots, the sum of power output from the grid and power output from the power generator approximately equal the load power. For example, from approximately 50 to approximately 60 seconds, all of the values are approximately constant over time: Load Power is approximately 25 KW, Power Output$_{TG}$ is approximately 15 KW and Power Meter is approximately 10 KW (the desired offset value). Thus, the offset between the Power Output$_{TG}$ and the Load Power is approximately 10 KW. At approximately 70 seconds, Load Power increases from approximately 25 KW to approximately 85 KW. Control logic, according to one embodiment, adjusts the Power Output$_{TG}$ to maintain the offset between the Power Output$_{TG}$ and the Load Power. At approximately 170 seconds, the values are approximately constant over time where Power Meter is approximately 10 KW (the offset value), Power Output$_{TG}$ is approximately 75 KW and Load Power is approximately 85 KW. Again, the difference between Power Output$_{TG}$ and Load Power is approximately 10 KW, which represents a constant demand value from the grid, i.e., Power Meter.

At approximately 200 seconds, Load Power decreases to approximately 0 KW. Because Power Output$_{TG}$ is high, this power is absorbed by the grid, in certain instances, the power flows back to the grid and Power Meter is negative, until Power Output$_{TG}$ ramps down to approximately 0 KW as well. In this instance there is no offset.

Figure 3:
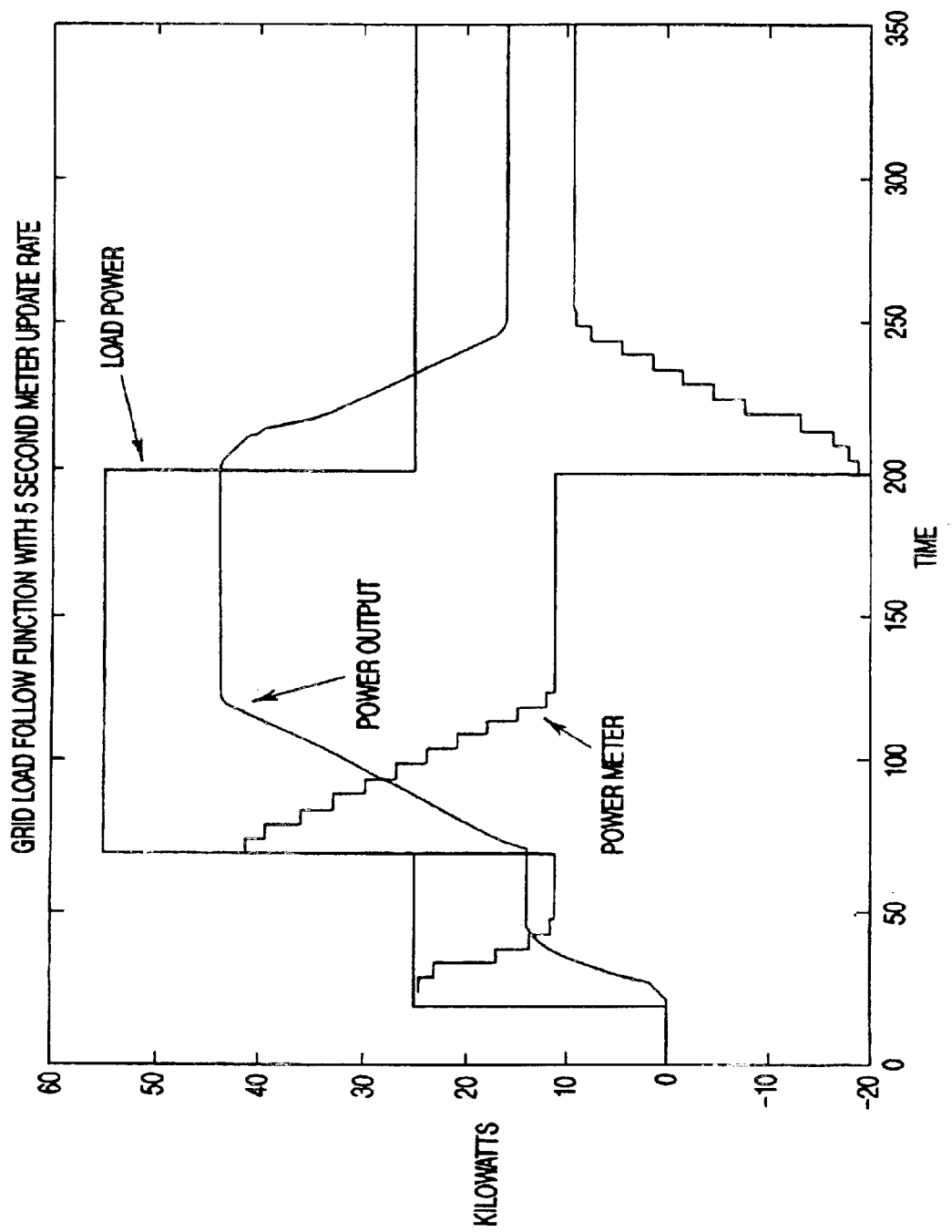
FIG. 3 is a plot of power versus time under grid logic control of an embodiment of the present invention wherein a 5 second update rate is used.

Referring to FIG. 3, a plot of power in kilowatts versus time in seconds is shown. In this particular example, the control logic was provided with a power meter reading every five seconds. This plot shows three values changing over time: power output from a power generator (Power Output$_{TG}$), load power or power demand (Load Power), and power from a grid, e.g., measured by a power meter (Power Meter). Throughout the plots, the sum of power output from the grid and power output from the power generator approximately equal the load power.

For example, from approximately 50 to approximately 60 seconds, all of the values are approximately constant over time: Load Power is approximately 25 KW, Power Output$_{TG}$ is approximately 15 KW and Power Meter is approximately 10 KW. Thus, the offset between the Power Output$_{TG}$ and the Load Power is approximately 10 KW. At approximately 70 seconds, Load Power increases from approximately 25 KW to approximately 55 KW. Control logic, according to one embodiment, adjusts the Power Output$_{TG}$ to maintain the offset between the Power Output$_{TG}$ and the Load Power. At approximately 125 seconds, the values are approximately constant over time where Power Meter is approximately 10 KW, Power Output$_{TG}$ is approximately 45 KW and Load Power is approximately 55 KW. Again, the difference between Power Output$_{TG}$ and Load Power is approximately 10 KW, which represents a constant demand value from the grid, i.e., Power Meter.

At approximately 200 seconds, another step change occurs in Load Power, from approximately 55 KW to approximately 25 KW. After approximately 50 seconds, Power Output reaches a constant of approximately 15 KW and Power Meter reaches a constant of approximately 10 KW. Note that the value is not the same as at the earlier time due to the tolerance band. In this particular instance, the control drives the error to within the tolerance band, not to zero; therefore, the steady state value may not be the same depending on whether the condition is approached from above or below.

Figure 4:
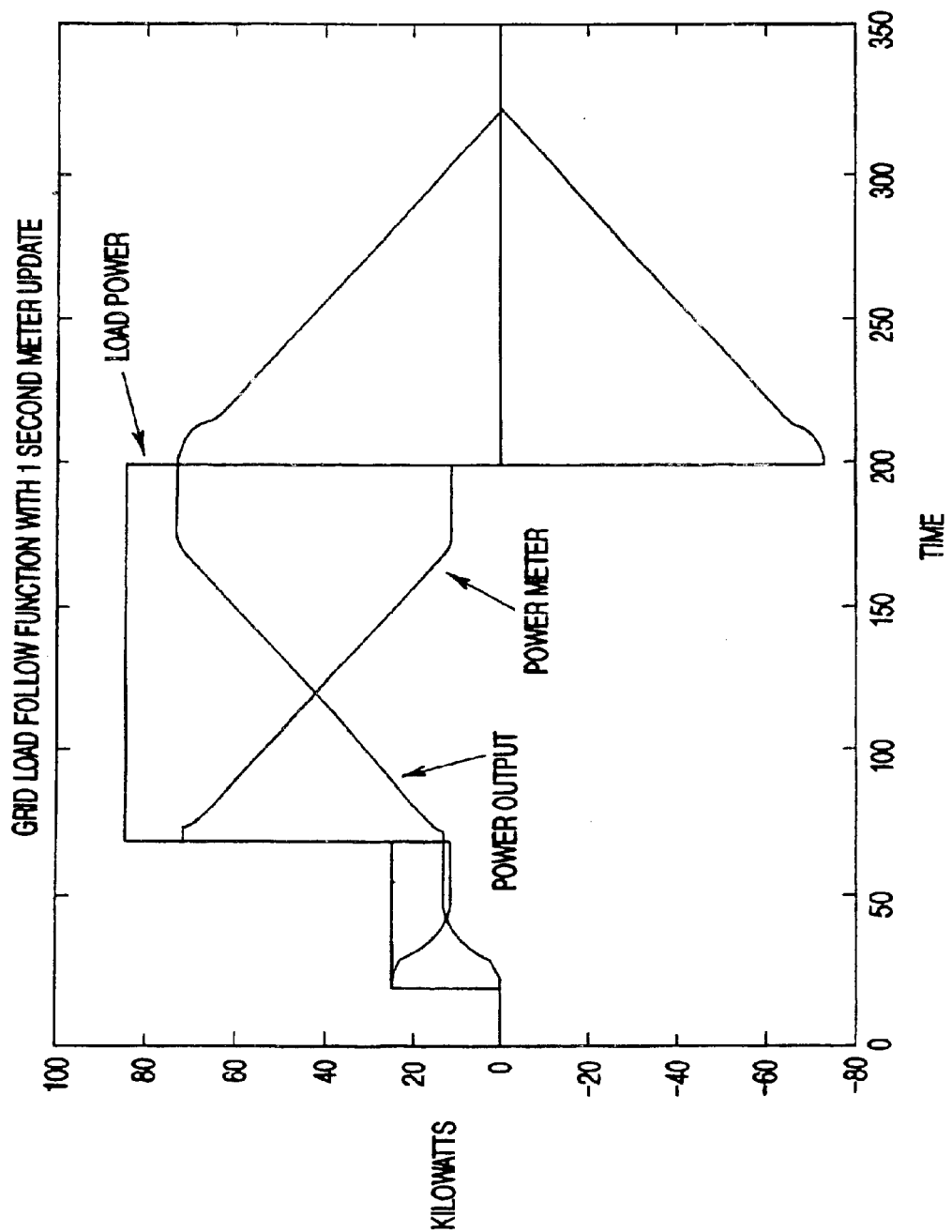
FIG. 4 is a plot of power versus time under grid logic control of an embodiment of the present invention wherein a 1 second update rate is used.
Figure 5:
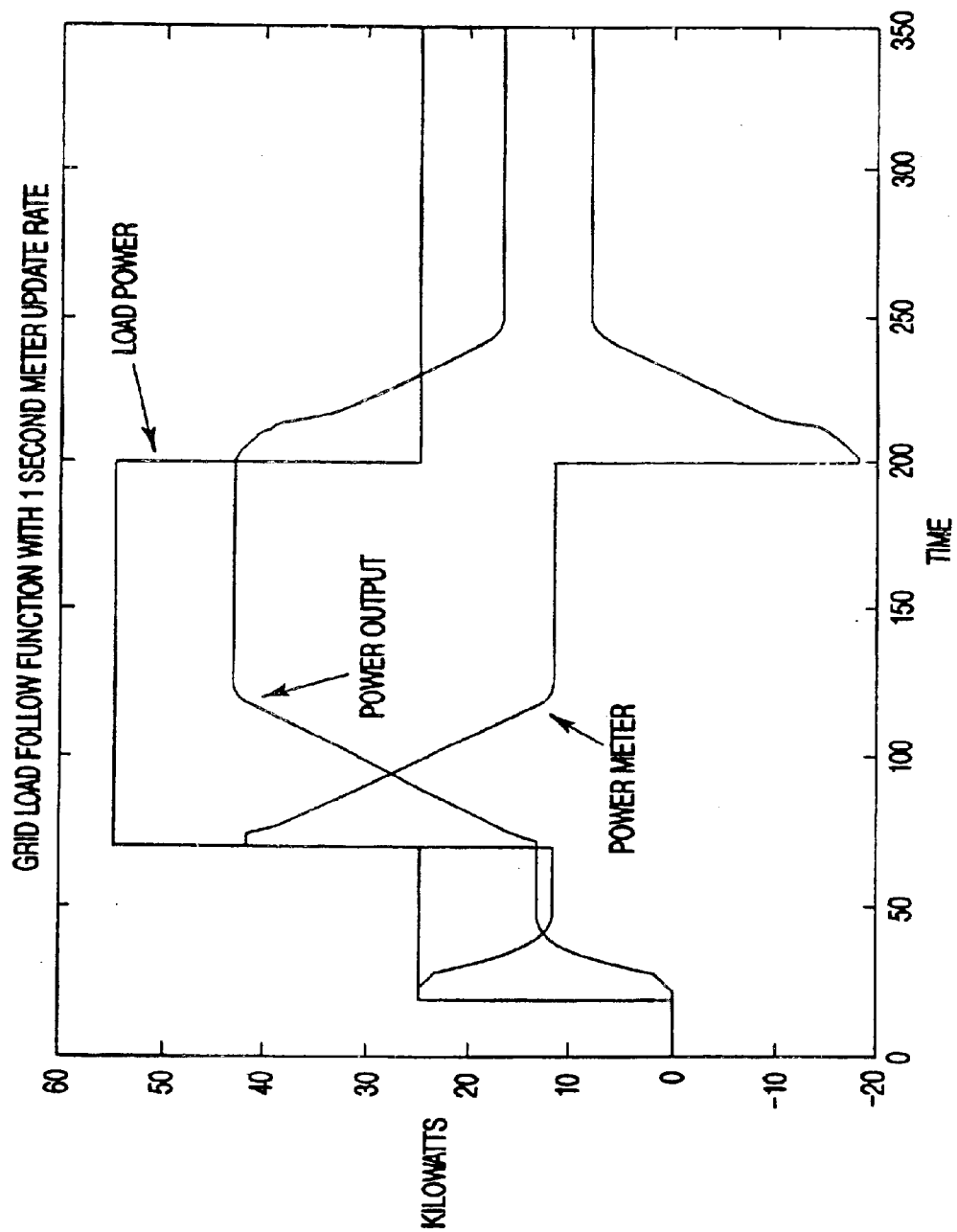
FIG. 5 is a plot of power versus time under grid logic control of an embodiment of the present invention wherein a 1 second update rate is used.

Referring to FIGS. 4 and 5, these are for the same runs as shown in FIGS. 2 and 3, respectively, except that the meter is read every second as compared to every five seconds.

The preceding examples can be repeated with similar success by substituting the generically or specifically described operating conditions of this invention for those used in the preceding examples.

Although the invention has been described in detail with particular reference to specific embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of supplying supplemental power from a supplemental power source in addition to that from a primary power source in order to meet power demand of a load, the method comprising the steps of:
    setting a set point for power received from the primary power source;
    establishing a variable gain for the supplemental power source; and
    employing the variable gain, periodically adjusting power supplied by the supplemental power source based on deviations between power actually received from the primary power source and the set point.

2. The method of claim 1 wherein the establishing step comprises establishing a variable gain that is higher for negative deviations between power actually received from the power source and the set point than for positive deviations.

3. The method of claim 1 wherein the employing step comprises adjusting via a variable gain reset—hold integrator.

4. The method of claim 1 wherein the employing step comprises measuring power actually received from the primary power source via a digital meter.

5. The method of claim 4 wherein in the measuring step the digital meter communicates readings to a supervisory control and data acquisition system.

6. The method of claim 5 additionally comprising the step of permitting control personnel to change the set point and variable gain by command to the supervisory control and data acquisition system via a World Wide Web browser interface.

7. The method of claim 1 wherein the supplemental power source comprises a turbine generator.

8. The method of claim 1 wherein the method results in load transients being absorbed by the primary power source rather than the supplemental power source.

9. The method of claim 1 wherein in the employing step a size of the power adjustment in each period is based on the product of the variable gain and a size of the deviation between power actually received from the primary power source and the set point.

10. The method of claim 1 wherein the employing step is invoked only when deviations between power actually received from the primary power source and the set point are outside a tolerance band.

11. The method of claim 10 wherein the tolerance band is established at least in part based on operating limitations of the microturbine.

12. The method of claim 10 wherein the tolerance band is established at least in part based on a desired insensitivity to small changes in the load.

13. The method of claim 1 additionally comprising the step of automatically resetting the set point to zero based on a turbine status bit related to an operating condition of the turbine, wherein the operating condition is chosen from the group that includes turbine speed, turbine inlet temperature, turbine exhaust temperature, fuel flow, and power output.

14. In a system employing a primary flow source and a supplemental flow source to satisfy a demand, wherein the supplemental flow source supplies flow to meet at least a portion of the demand, a method of maintaining a fixed flow offset between the primary flow source and the supplemental flow source, the method comprising the steps of:
    (a) creating an actual primary flow source measurement by measuring flow from the primary flow source to the demand;
    (b) developing an error signal by establishing a difference between the fixed flow offset from the actual primary flow source flow measurement;
    (c) establishing a gain;
    (d) creating an input by multiplying the error signal by the gain;
    (e) establishing a predetermined tolerance range;
    (f) creating a supplemental flow source flow adjustment command based upon the input; and
    (g) adjusting the flow output of the supplemental flow source based on the supplemental flow source flow adjustment command, thereby driving the error signal to within the predetermined tolerance range.

15. The method of claim 14 wherein the step of establishing a gain comprises establishing a variable gain.

16. The method of claim 14 wherein the step of creating a supplemental flow source flow adjustment command comprises integrating the input.

17. In a system employing a primary power source and a supplemental power source to satisfy a power load, wherein the supplemental power source supplies power to meet at least a portion of the power load, a method of maintaining a fixed power offset between the primary power source and the supplemental power source, the method comprising the steps of:
    (a) creating an actual primary power source measurement by measuring power flow from the primary power source to the power load;
    (b) developing an error signal by subtracting the fixed power offset from the actual primary power source power measurement;
    (c) establishing a gain;
    (d) creating an input by multiplying the error signal by the gain;
    (e) establishing a predetermined tolerance range;
    (f) creating a supplemental power source power adjustment command based upon the input; and
    (g) adjusting the power output of the supplemental power source based on the supplemental power source power adjustment command, thereby driving the error signal to within the predetermined tolerance range.

18. The method of claim 17 wherein the step of establishing a gain comprises establishing a variable gain.

19. The method of claim 17 wherein the step of creating a supplemental power source power adjustment command comprises integrating the input.

20. In a grid-connected application of a microturbine having an adjustable power output up to a predetermined maximum power output and wherein the microturbine supplies power to meet at least a portion of an end-user's power load, a method of maintaining a fixed power offset between the grid and the end-user's power load regardless of the load demanded (up to the sum of the fixed power offset and the microturbine's predetermined maximum power output), the method comprising the steps of:
    (a) creating an actual grid power measurement by measuring power flow from the grid to the end-user's power load;
    (b) developing an error signal by subtracting the fixed power offset from the actual grid power measurement;
    (c) establishing a gain;
    (d) creating an input by multiplying the error signal by the gain;
    (e) establishing a predetermined tolerance range;
    (f) creating a microturbine power adjustment command based upon the input; and
    (g) adjusting the power output of the microturbine based on the microturbine power adjustment command, thereby driving the error signal to within the predetermined tolerance range.

21. The method of claim 20 wherein the step of establishing a gain comprises establishing a variable gain.

22. The method of claim 21 wherein the step of establishing a gain comprises establishing a variable gain that is higher for an error signal representing a negative deviation between the actual grid power measurement and the fixed power offset than for positive deviations.

23. The method of claim 20 wherein the step of creating a microturbine power adjustment command comprises integrating the input.

24. The method of claim 20 wherein, in step (e), the predetermined tolerance range is established at least in part based on operating limitations of the microturbine.

25. The method of claim 20 wherein, in step (e), the predetermined tolerance range is established at least in part based on a desired insensitivity to small changes in the end-user's power load.

26. The method of claim 20 wherein the step of creating an actual grid power measurement comprises employing a digital meter.

27. The method of claim 26 wherein the step of creating an actual power grid measurement comprises the digital meter communicating readings to a supervisory control and data acquisition system.

28. The method of claim 27 additionally comprising the step of permitting control personnel to change the fixed power offset and gain by command to the supervisory control and data acquisition system via a World Wide Web browser interface.

29. The method of claim 20 wherein the method results in load transients being absorbed by the grid rather than the microturbine.

30. The method of claim 20 additionally comprising the step of automatically resetting the fixed power offset to zero based on a turbine status bit related to an operating condition of the turbine, wherein the operating condition is chosen from the group that includes turbine speed, turbine inlet temperature, turbine exhaust temperature, fuel flow, and power output.

* * * * *